US010528550B2

(12) United States Patent
Branson et al.

(10) Patent No.: US 10,528,550 B2
(45) Date of Patent: *Jan. 7, 2020

(54) EVICTION STREAM FOR DATA JOINS

(71) Applicant: International Business Machines Corporation, Armonk, NY (US)

(72) Inventors: Michael J. Branson, Rochester, MN (US); Bradford L. Cobb, Katy, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

This patent is subject to a terminal disclaimer.

(21) Appl. No.: 14/692,842

(22) Filed: Apr. 22, 2015

(65) Prior Publication Data

US 2016/0217148 A1 Jul. 28, 2016

Related U.S. Application Data

(63) Continuation of application No. 14/606,253, filed on Jan. 27, 2015.

(51) Int. Cl.
*G06F 16/23* (2019.01)
*G06F 16/2455* (2019.01)

(52) U.S. Cl.
CPC .... *G06F 16/2379* (2019.01); *G06F 16/24568* (2019.01)

(58) Field of Classification Search
CPC ......... G06F 17/30377; G06F 17/30516; G06F 17/30539; G06F 2201/86; G06F 11/3006; G06F 11/3072; G06F 2201/81; G06F 2201/88; G06F 17/30498; G06F 16/2379; G06F 16/24568

(Continued)

(56) References Cited

U.S. PATENT DOCUMENTS 6,952,692 B1 * 10/2005 Bhattiprolu ......... G06F 16/2343
707/704
2008/0275891 A1 11/2008 Park et al.

(Continued)

OTHER PUBLICATIONS

Gedik et al., Article: "Generic windowing support for extensible stream processing systems", Published online in Wiley Online Library, Copyright 2013. (Year: 2013).*

(Continued)

*Primary Examiner* — Evan Aspinwall
(74) *Attorney, Agent, or Firm* — Peter K. Suchecki

(57) ABSTRACT

The method can include receiving the first stream of tuples to be processed by the stream operator hosted by one or more computer processors, the stream operator having at least one input port and a condition input port. The method can also include receiving, at runtime, a customized condition at the condition input port of the stream operator. The method can also include monitoring a first group of one or more tuples from the first stream of tuples at a first window of the stream operator. The method can also include determining whether the first group of one or more tuples at the first window fulfills the customized condition. The method can also include deleting, in response to the first group of one or more tuples fulfilling the customized condition, the first group of one or more tuples.

19 Claims, 9 Drawing Sheets

(58) Field of Classification Search
USPC .......................................................... 707/714
See application file for complete search history.

(56) References Cited

U.S. PATENT DOCUMENTS

| | | | |
|---|---|---|---|
| 2009/0112853 A1* | 4/2009 | Nishizawa | G06F 17/30516 |
| 2010/0106946 A1 | 4/2010 | Imaki et al. | |
| 2010/0250572 A1* | 9/2010 | Chen | G06F 17/3051 |
| | | | 707/759 |
| 2010/0293532 A1* | 11/2010 | Andrade | G06F 11/1438 |
| | | | 717/140 |
| 2010/0325132 A1* | 12/2010 | Liu | G06F 17/30516 |
| | | | 707/759 |
| 2011/0040734 A1* | 2/2011 | Andrade | G06F 17/30516 |
| | | | 707/692 |
| 2011/0093479 A1 | 4/2011 | Fuchs | |
| 2011/0213802 A1* | 9/2011 | Singh | G06F 17/30539 |
| | | | 707/774 |
| 2012/0078975 A1* | 3/2012 | Chen | G06F 17/30516 |
| | | | 707/803 |
| 2012/0110042 A1* | 5/2012 | Barsness | G06F 17/30289 |
| | | | 707/825 |
| 2012/0215934 A1 | 8/2012 | Barsness et al. | |
| 2013/0166618 A1 | 6/2013 | Branson et al. | |
| 2013/0166620 A1* | 6/2013 | Branson | H04L 67/10 |
| | | | 709/201 |
| 2013/0179591 A1 | 7/2013 | Branson et al. | |
| 2014/0089351 A1 | 3/2014 | Branson et al. | |
| 2014/0089352 A1 | 3/2014 | Branson et al. | |
| 2014/0095503 A1 | 4/2014 | Branson et al. | |
| 2014/0095506 A1 | 4/2014 | Branson et al. | |
| 2015/0134797 A1* | 5/2015 | Theimer | H04L 41/24 |
| | | | 709/223 |
| 2016/0063080 A1* | 3/2016 | Nano | G06F 17/30498 |
| | | | 707/602 |
| 2016/0179799 A1* | 6/2016 | Raman | G06F 8/443 |
| | | | 707/822 |

OTHER PUBLICATIONS

Gedik, "Generic windowing support for extensible stream processing systems", Software—Practice and Experience 2013, Copyright 2013 John Wiley & Sons, Ltd., 24 pages.

Anonymous, "Self-Join Optimizations", an IP.com Prior Art Database Technical Disclosure, IP.com No. 000205258, Mar. 22, 2011, pp. 1-7. http://null/IPCOM/000205258.

Olteanu et al., "SPROUT: Lazy vs. Eager Query Plans for Tuple-Independent Probabilistic Databases", ICDE '09: IEEE 25th International Conference on Data Engineering, 2009, pp. 640-651. DOI: 10.1109/ICDE.2009.123.

Software Patent Institute et al., "Relational Data Base Machines", An IP.com Prior Art Database Technical Disclosure, electronic publication: Nov. 10, 2005, IP.com No. 000131377, original publication: Mar. 1, 1979, IEEE Computer vol. 12 No. 3, pp. 28-38. http://null/IPCOM/000131377.

Gedik et al., "SPADE: The System S Declarative Stream Processing Engine", 2008, ACM, SIGMOD '08 Jun. 9-12, 2008, pp. 1123-1134.

Branson et al., "Eviction Stream for Data Joins", U.S. Appl. No. 14/606,253, filed Jan. 27, 2015.

List of IBM Patent or Patent Applications Treated as Related.

Branson et al., "Eviction Stream for Data Joins", U.S. Appl. No. 16/392,718, filed Apr. 24, 2019.

IBM, List of IBM Patents or Patent Applications Treated as Related, May 9, 2019, 2 pages.

\* cited by examiner

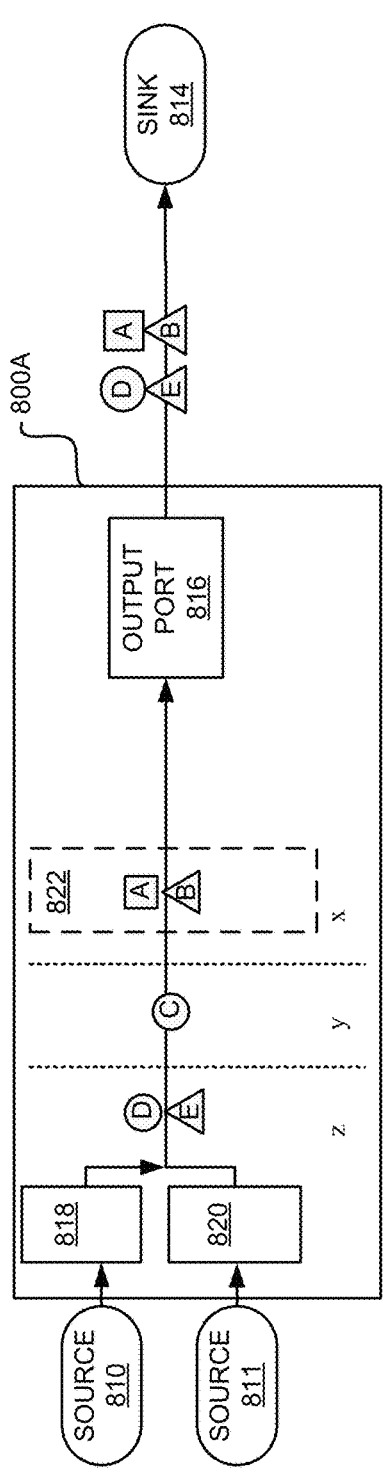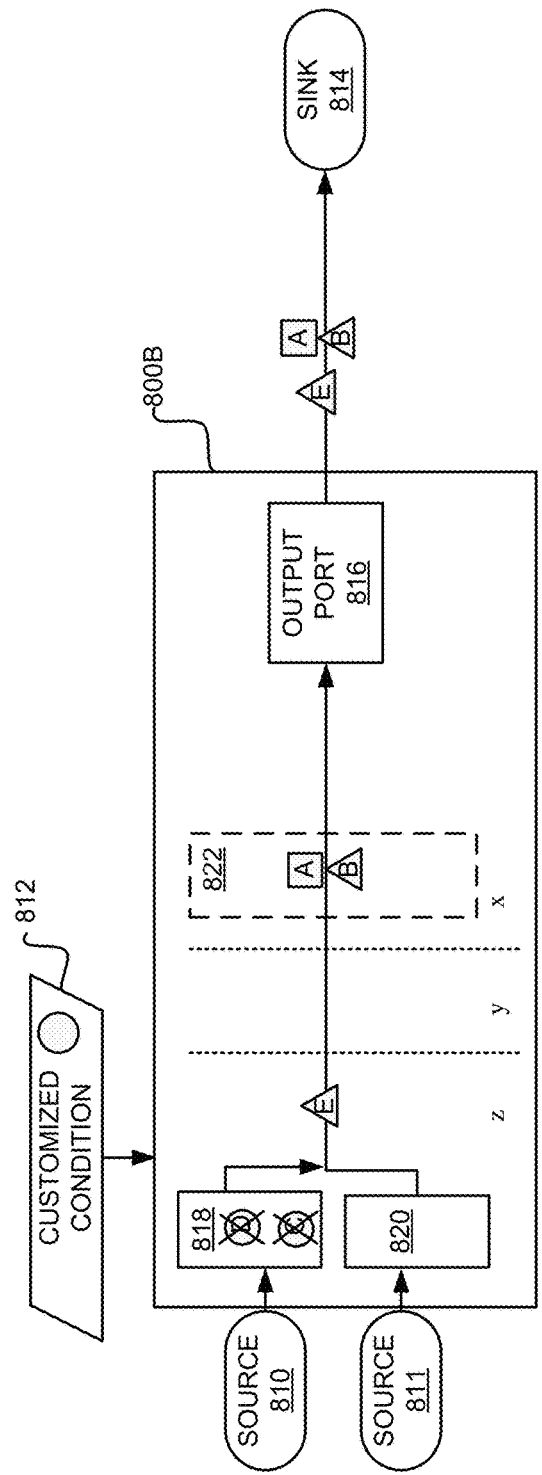
FIG. 8A
FIG. 8B

EVICTION STREAM FOR DATA JOINS

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

One embodiment is directed toward a method for managing a first stream of tuples within a window of a stream operator. The method can include receiving the first stream of tuples to be processed by the stream operator hosted by one or more computer processors, the stream operator having at least one input port and a condition input port. The method can also include receiving, at runtime, a customized condition at the condition input port of the stream operator. The method can also include monitoring a first group of one or more tuples from the first stream of tuples at a first window of the stream operator. The method can also include determining whether the first group of one or more tuples at the first window fulfills the customized condition. The method can also include deleting, in response to the first group of one or more tuples fulfilling the customized condition, the first group of one or more tuples.

Another embodiment is directed toward a system for managing a first stream of tuples within a window of a stream operator. The system can include a memory, and a computer processor communicatively coupled to the memory. The system can include one or more stream operators operating on one or more computer processors and the memory. The stream operator can be configured to receive the first stream of tuples to be processed by a stream operator. The stream operator having at least one input port and a condition input port. The stream operator can be configured to receive, at runtime, a customized condition at the condition input port of the stream operator. The stream operator can be configured to monitor a first group of one or more tuples from the first stream of tuples at a first window of the stream operator. The stream operator can be configured to determine whether the first group of one or more tuples at the first window fulfills the customized condition. The stream operator can be configured to delete, in response to the first group of one or more tuples fulfilling the customized condition, the first group of one or more tuples.

Another embodiment is directed toward a computer program product for managing a first stream of tuples within a window of a stream operator comprising a computer readable storage device having a computer readable program stored therein. The computer readable program, when executed on a computing device, causes the computing device to receive the first stream of tuples to be processed by the stream operator hosted by one or more computer processors, the stream operator having at least one input port and a condition input port. The computer readable program can also cause the computing device to receive, at runtime, a customized condition at the condition input port of the stream operator. The computer readable program can also cause the computing device to monitor a first group of one or more tuples from the first stream of tuples at a first window of the stream operator. The computer readable program can also cause the computing device to determine whether the first group of one or more tuples at the first window fulfills the customized condition. The computer readable program can also cause the computing device to delete, in response to the first group of one or more tuples fulfilling the customized condition, the first group of one or more tuples.

BRIEF DESCRIPTION OF THE DRAWINGS

FIG. 8A illustrates an example of the operation of a windowed stream operator 800A processing tuples, according to various embodiments.

FIG. 8B illustrates an example of the operation of a windowed stream operator 800B that is configured to delete tuples in response to the customized condition 812, according to various embodiments.

Like reference numbers and designations in the various drawings indicate like elements.

DETAILED DESCRIPTION

Figure 1:
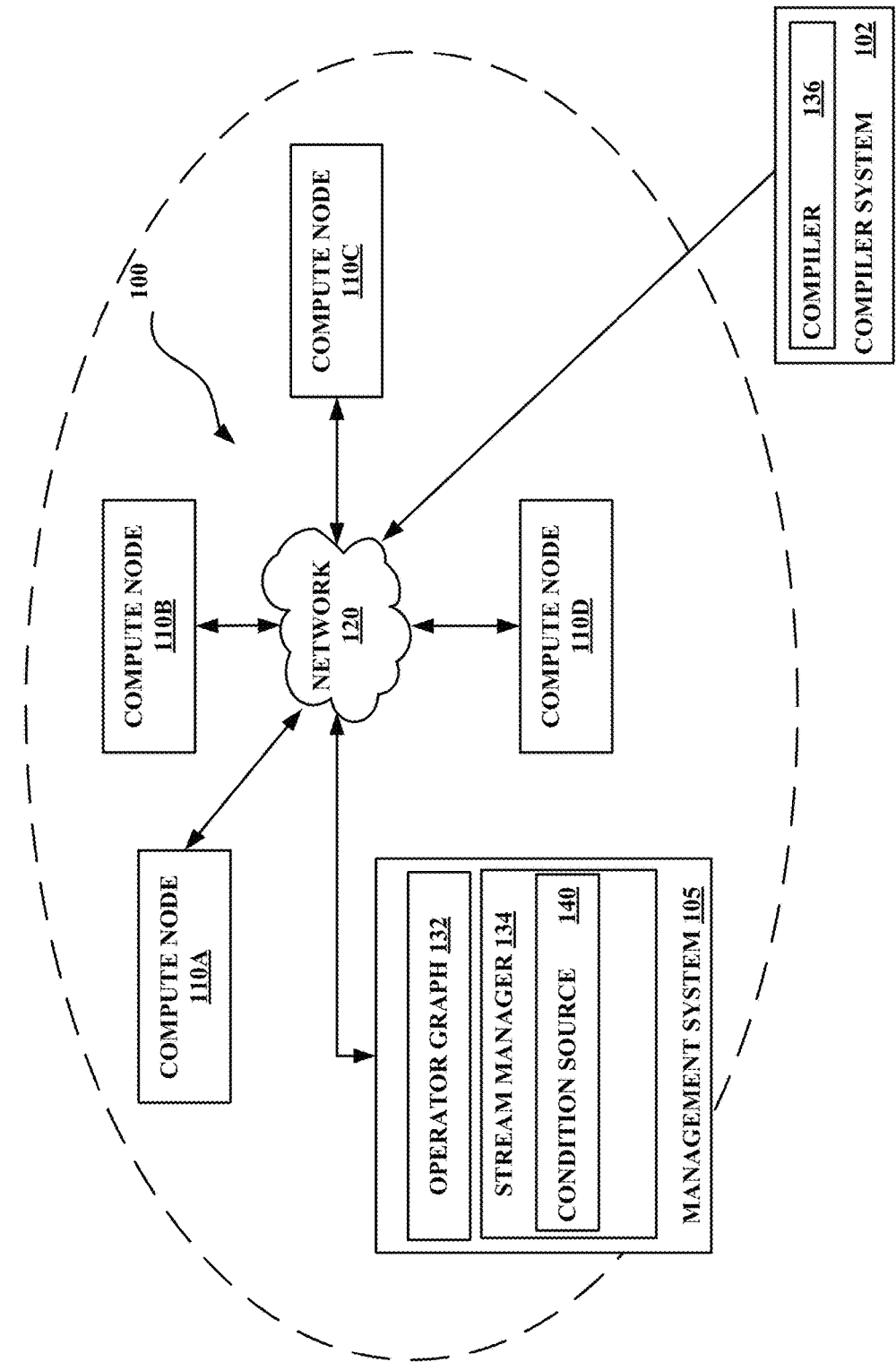
FIG. 1 illustrates a computing infrastructure configured to execute a stream computing application according to various embodiments.

Aspects of the present disclosure are generally directed to managing a stream of tuples from a windowed stream operator. The windowed stream operator can have a condition input port that exclusively receives a customized condition. The customized condition is used to delete tuples from one or more of the input ports of the windowed stream operator. The customized condition is customizable by a user and causes the windowed stream operator to delete tuples that fulfill the customized condition from the stream of tuples. Although not necessarily limited thereto, embodiments of the present disclosure can be appreciated in the context of streaming data and problems relating to routing tuples in the stream of data. Throughout this disclosure, the term stream operator may be abbreviated "S.O." or "OP".

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Streams computing is a distributed programming paradigm where applications are split into pieces such that an application is distributed across a series of processes running on one or more machines. The processes are connected together by sending streams of data into and out of the processes. These streams have attributes and are sent one tuple at a time. Contracts exist between processing elements to establish who sends and receives tuples, i.e., how the processing elements are connected. The processes may run continuously and the processes main thread can be a call back routine that executes when data arrives at any of the incoming ports.

Stream operators may transmit a tuple in an operator graph (described further herein). Generally, the operator graph can have a plurality of stream operators that produce a particular end result, e.g., calculate an average. The operator graph can have a stream operator that utilizes a window to group tuples for processing. In various embodiments, a join stream operator is a type of windowed stream operator. Other windowed stream operators may include aggregate, sort, user-defined operators and other stream operators.

A join operator, or join stream operator, is used to correlate tuples from two streams based on user-specified match predicates and window configurations. When a tuple is received on an input port, it is inserted into the window corresponding to the input port, which may cause the window to trigger a tumble or slide in the window. When a tuple is received on an input port, the tuple is compared against all tuples inside the window of the opposing input port. If the tuples match, then an output tuple can be produced for each match. If at least one output was generated, a window punctuation can be generated after all the outputs. The join operator can also have a time based eviction policy which means anything that has been in the window for a defined period of time may eventually be removed.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
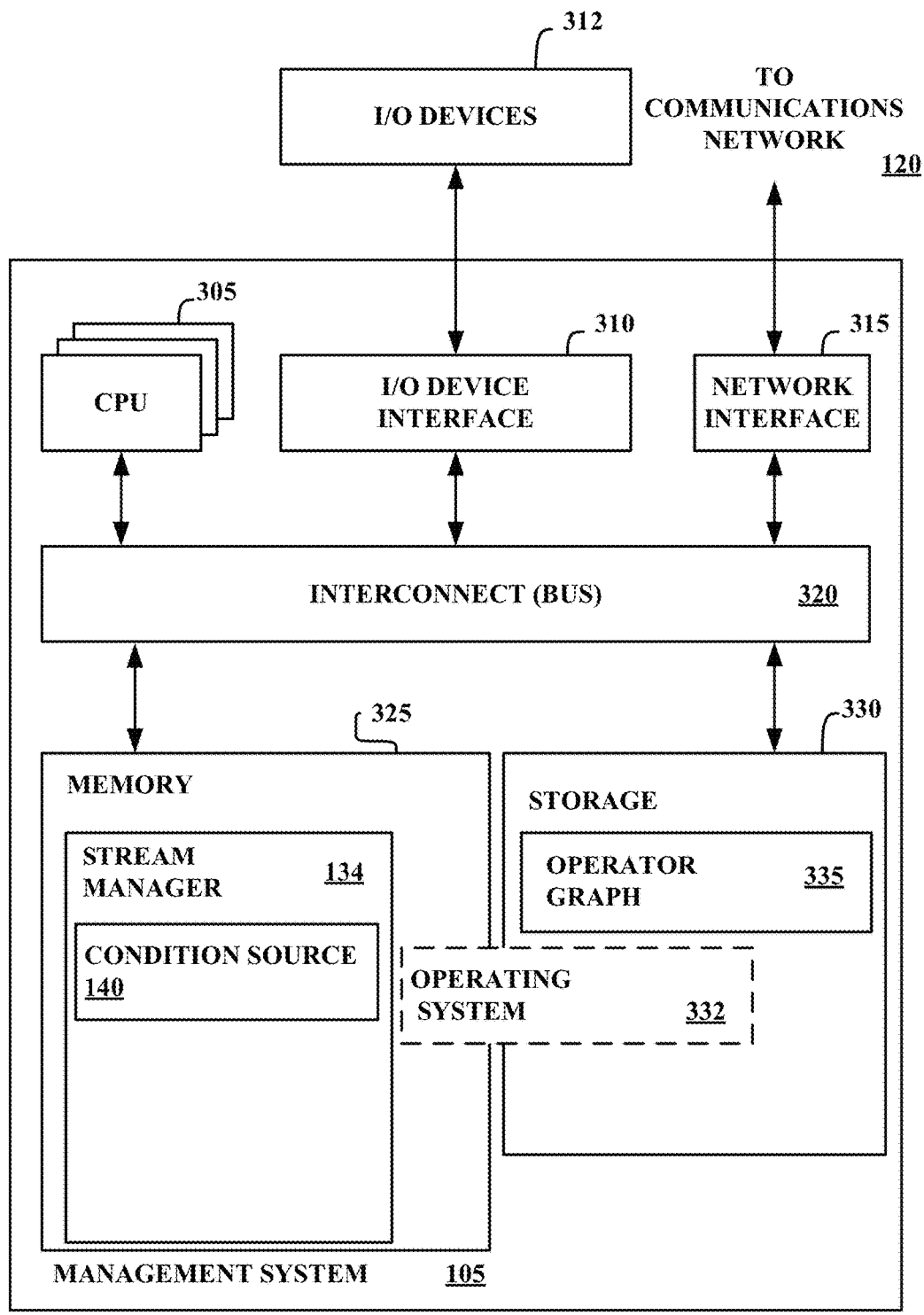
FIG. 3 illustrates a more detailed view of the management system of FIG. 1 according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132. The stream manager 134 can have components such as a condition source 140. The condition source 140 can provide a customized condition to a windowed stream operator. The windowed stream operator can remove tuples in response to the one or more tuples fulfilling the customized condition. The condition source 140 can exist as a component of the streams runtime (i.e., the stream manager 134). The streams runtime may trigger the condition source 140 to provide the customized condition. In various embodiments, the condition source 140 can be a repository that provides instructions for compilation of a windowed stream operator, such that once the customized condition is determined to be fulfilled by a tuple at the stream operator (as defined by a programmer), the stream operator can send tuples fulfilling the condition into an eviction stream where the tuples are deleted.

In various embodiments, the condition source 140 provides a customized condition to a windowed stream operator. The customized condition may be distinct from a windowing condition present in the windowed stream operator in that the windowing condition applies to tuples in a window. For example, the windowing condition is compiled into the windowed stream operator at compile time and may not be changed without further compilation. The customized condition is a condition that is processed by a windowed stream operator at runtime.

The condition source 140 can be a streams runtime component that sends in the customized conditions to various windowed stream operators based off of streams runtime conditions. For example, the streams runtime conditions can be a performance analysis of the system or operator graph. The streams runtime conditions could be used to determine which tuples should be deleted and when the tuples should be deleted. The condition source 140 can also be built into the application by a programmer. The programmer can further send the customized conditions to the windowed stream operator, according to various embodiments.

Generally, a stream operator can collect various performance data. The performance data can be any type of data that indicates performance of a stream operator. The performance data can include a total processing time from the stream operator to the measuring stream operator. To measure processing time, the stream operator can introduce a timestamp to the metadata of the tuple which can be read by the measuring stream operator to determine the time elapsed.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
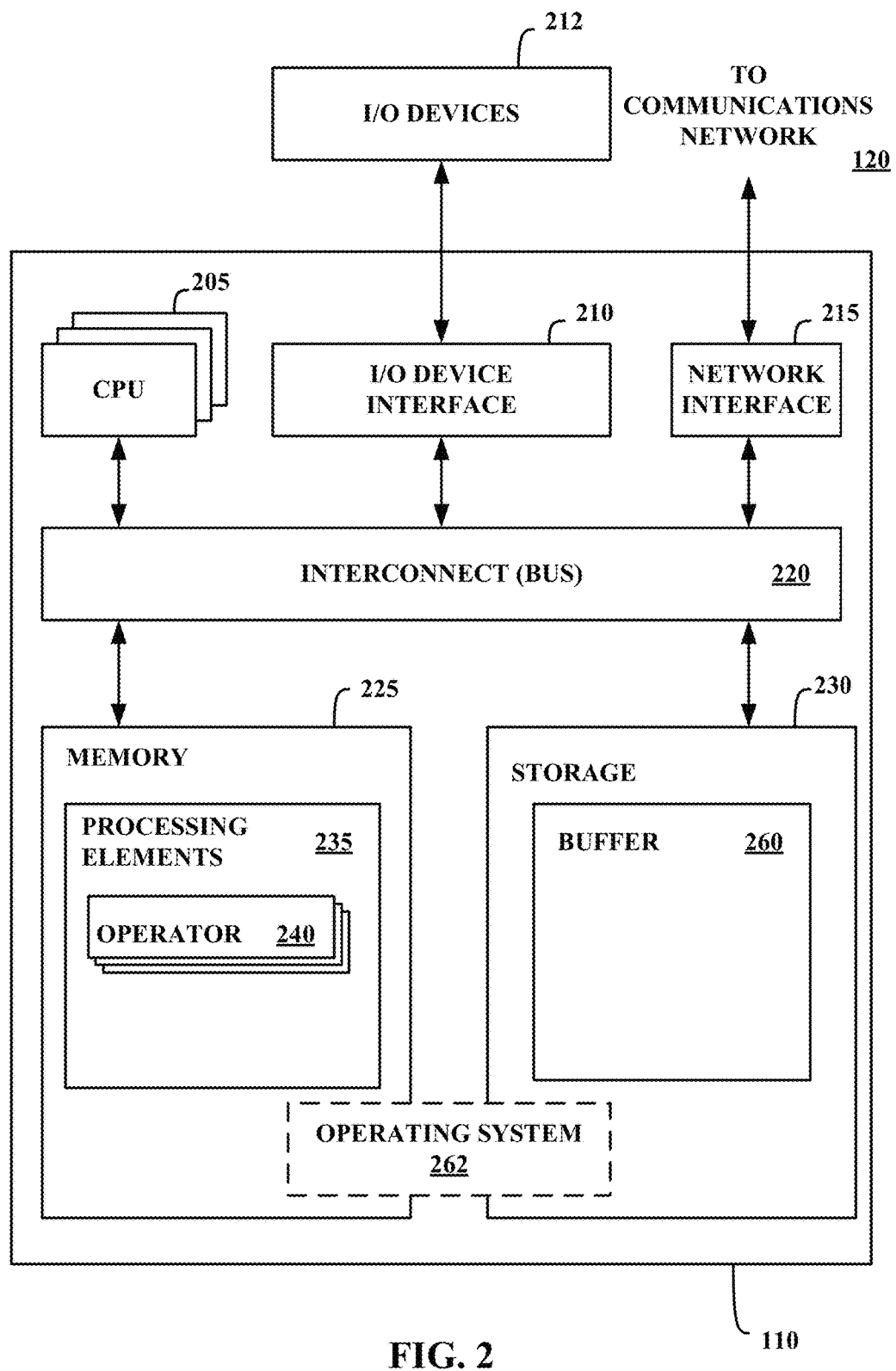
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. The stream manager 134 can have software features that enable the stream manager 134 to manage the stream operators on the operator graph 335. The stream manager 134 can also have a condition source 140 to provide a customized condition to a customized input port of a windowed stream operator within the operator graph 335.

Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
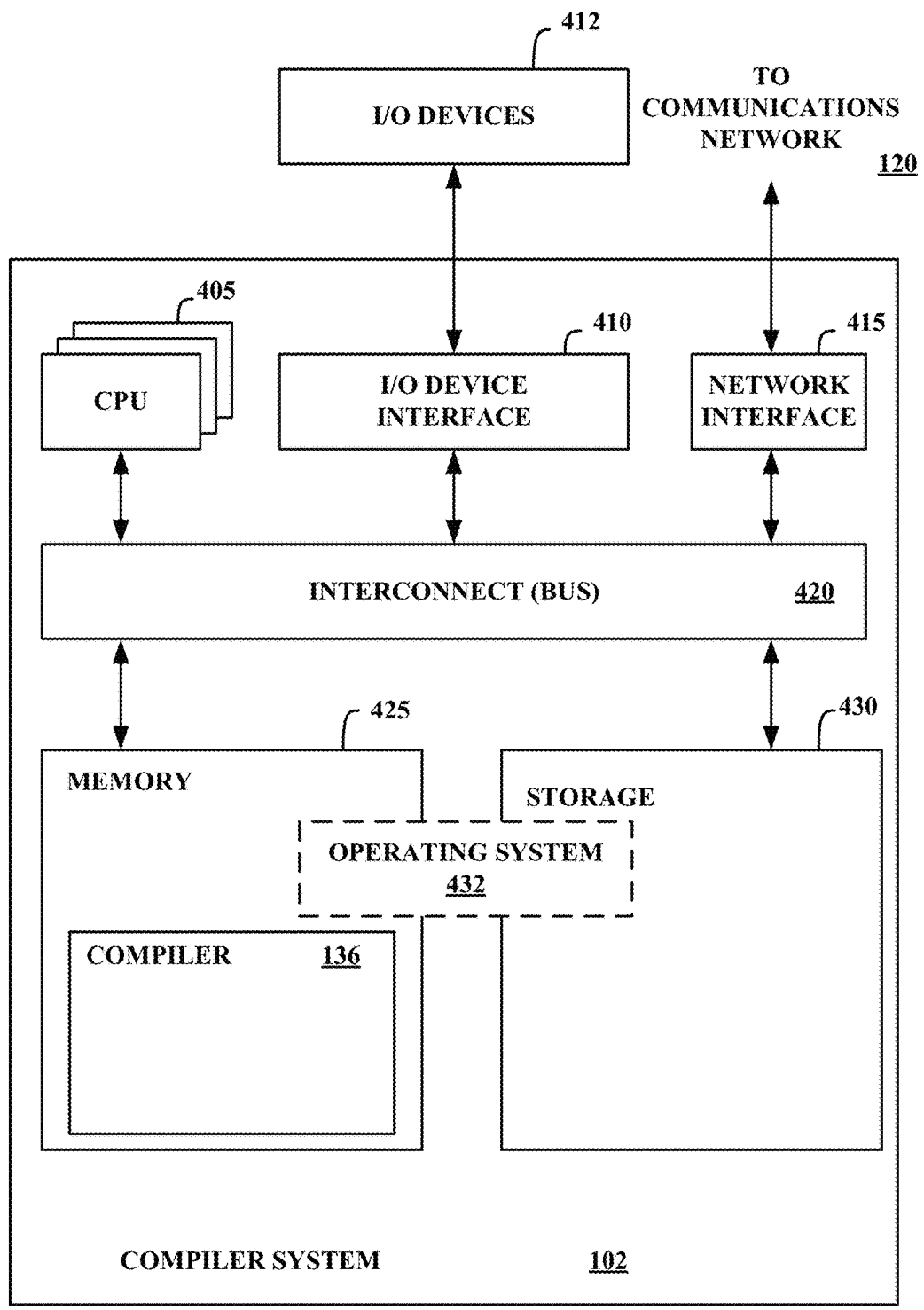
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
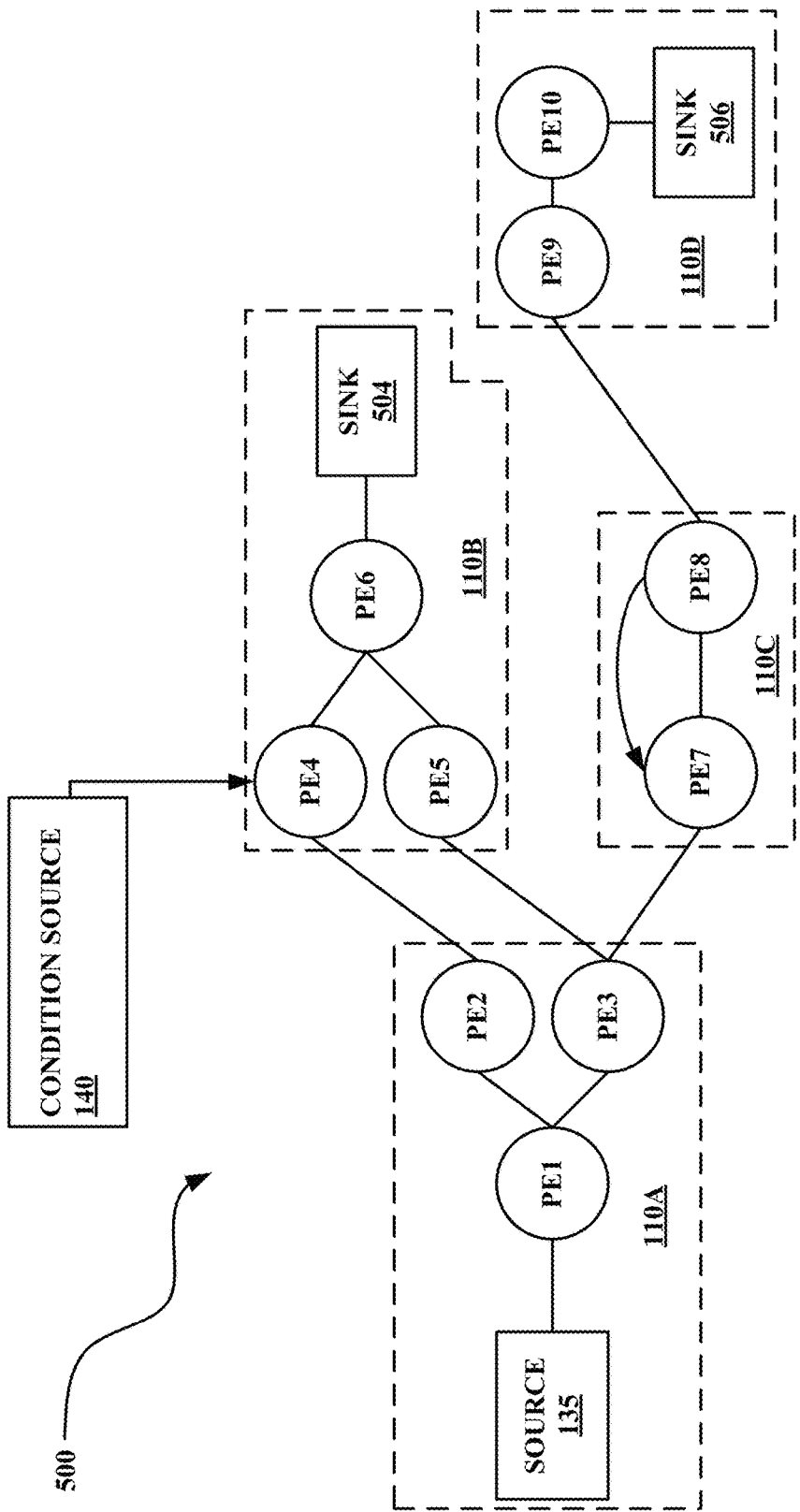
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 and PE10 on compute node 110D, which in turn outputs tuples to be processed by operators in a sink processing element 506.

For purposes of illustration, the operator graph 500 may also have a condition source 140. The condition source may provide a customized condition to PE4. PE4 may monitor a stream of tuples to determine whether any tuple fulfills the customized condition. If so, then PE4 may delete the tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be an executable element of fused stream operators, it is equally correct to describe the operator graph as one or more execution paths between specific stream operators, which may include execution paths to different stream operators within the same processing element. For instance, the condition source 140 providing a customized condition to PE4 can refer to a customized condition being provided to any stream operator within PE4 or a specific stream operator that utilizes windows.

Figure 6:
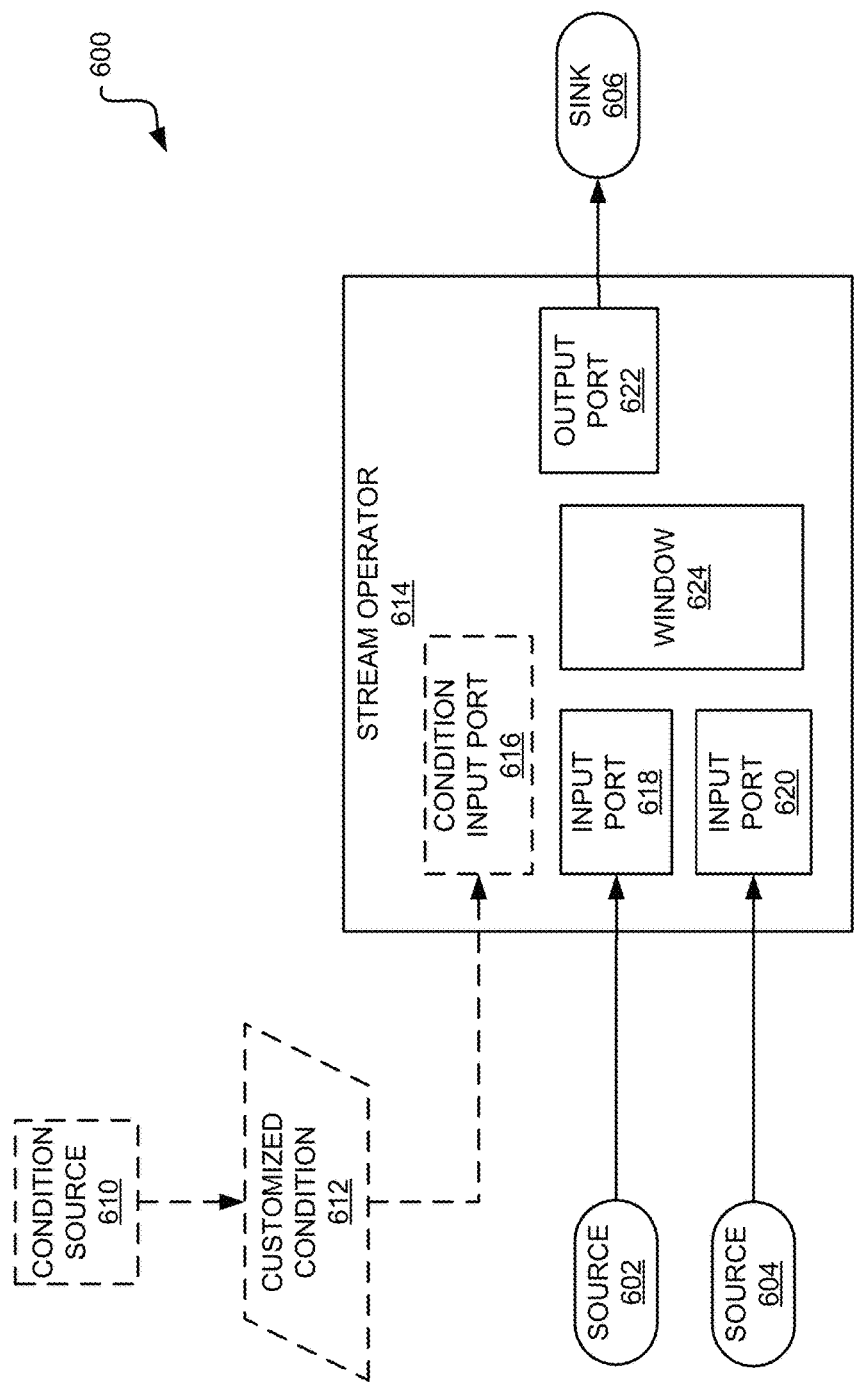
FIG. 6 illustrates a simplified operator graph 600 that utilizes a customized condition 612, according to various embodiments.

FIG. 6 illustrates a simplified operator graph 600 that utilizes a customized condition 612, according to various embodiments. The operator graph 600 can have a stream operator 614 that utilizes a window to categorize tuples, or a windowed operator. The stream operator 614 can receive a stream of tuples from sources 602,604 and output to a sink 606.

In various embodiments, the stream operator 614 can be part of a processing element and hosted by one or more computer processors. The stream operator 614 receives the stream of tuples and processes the stream of tuples. The stream operator 614 has at least one input port e.g., 618, 620 and a condition input port 616.

The condition input port 616 is a specialized port within the stream operator. The condition input port 616 can be an input port that is configured to receive one or more customized conditions 612 from the condition source 610 and the stream of tuples. Thus, an input port, e.g., 618, 620, can be configured to receive both a stream of tuples and a customized condition within the stream of tuples. An aspect of this disclosure calls for an exclusive input condition port 616 that receives the customized condition 612 independent from the stream of tuples. The stream operator 614 can use the customized condition 612 to cause the deletion of a tuple. The customized condition 612 can be changed "on the fly" to delete tuples of varying types. The stream operator 614 receives the customized condition 612 and applies the customized condition 612 to tuples within a window. If the tuples fulfill a customized condition 612, then the tuples may be deleted. In various embodiments, the fulfilling tuples may be deleted at the input ports 618, 620, prior to entering the window 624 defined by the stream operator 614.

The deletion or removal of tuples that fulfill the customized condition 612 may occur at a variety of instances. The removal of tuples can occur simultaneously with the receipt of the customized condition by the stream operator or the removal of tuples can take place in a period of time based off of the arrival of the customized condition. In various embodiments, the period of time determination may exclude the processing time inherent with processing a customized condition 612. For example, truly simultaneous removal of tuples upon receipt of the customized condition 612 may prove elusive since there may be a short time for the stream operator to process the customize condition 612. Thus, simultaneous may refer to after the stream operator 614 processes the customized condition 612, according to various embodiments. The time period acts independent from any customized condition 612. For example, the stream operator 614 may be configured to remove tuples that fulfill the condition 612 after 5 minutes have elapsed. If the customized condition 612 calls for removing tuples after 2 minutes for a window 624 of 10 minutes, then the tuples received from minute 7 to minute 10 may be removed.

In various embodiments, the removal of tuples can occur on an individual basis or as a group of tuples. For example, if tuples are removed on an individual basis, then a tuple meeting the customized condition may be removed. If the tuples are removed on a group basis, then if any tuple from a group of tuples meet the customized condition, then the entire group of tuples may be removed. Removing tuples on a group basis can be advantageous where data from a particular source is known to be relatively homogeneous at particular times. For example, if data from a stream is homogenous, then tuples would have similar properties and could be deleted based on association. The removal of tuples on a group basis may also include removing tuples within an entire window 624.

The removal of tuples can occur after a number of tuples on either of the input ports 618, 620 are received. For example, if the window size is 100,000 tuples for the stream operator 614, and the customized condition 612 calls for the stream operator to delete the first 50,000 tuples from the window, then the deletion can be triggered after 50,000 tuples to retain tuples 1-50,000 and remove tuples 50,001-100,000.

The removal of tuples can also take place after a number of upstream or downstream join operations. A tracker may be implemented for a particular tuple. For example, metadata can be modified to indicate the number of times a tuple is previously joined. If the removal of tuples is triggered by a tuple that has been joined 3 times in upstream join operations, then the tuple can trigger the removal of tuples that fulfill a customized condition 612 once it is joined for the third time. The removal of tuples can also be triggered by the number of downstream join operations. For example, if the removal of tuples is triggered by a tuple joined 3 times, then a tuple is joined once at the stream operator 614, then 2 other times in downstream operations can trigger the removal of tuples. The run time can keep track of downstream operations and the number of times a particular tuple is joined.

In various embodiments, the stream operator 614 is a join stream operator that joins two different streams of tuples from different sources. Thus, the stream operator has at least two input ports and the condition input port. For example, the stream operator 614 receives a stream of tuples from source 602 and source 604 at input ports 618 and 620 respectively. The stream operator 614 may join the stream of tuples according a windowing condition for a window 624 defined previously by a user. Once joined, then the joined stream of tuples may be output at the output port 622 and to a sink 606. In various embodiments, a join operation can occur by joining two separate sets of tuples as the tuples arrive. The size of a join window can be used to trigger either a slide or tumble in the window. In an illustrative example, the source 602 can be a news feed and the source 604 can be a social media feed for a user. The two sources 602, 604 can be combined based on a windowing condition of tuple count (e.g., every 3 tuples). Thus, when the window 624 has three tuples from both sources 602, 604, then the window 624 triggers and the combined tuples are output to the sink 606. If a new customized condition 612 (e.g., a list of Uniform Resource Locators (URLs)) is introduced, then the stream operator 614 can delete the tuples with URLs specified in the customized condition 612. The stream operator 614 can delete the tuples from the window 624, according to various embodiments.

As another example, if the customized condition 612 is based on a count of seven and there are 10 tuples incoming, then the stream operator 614 can delete the first seven tuples from the window 624 and reset the counter of the window so that tuples 8-10 are included in the window. In various embodiments, the customized condition 612 may be used before a windowing condition is fulfilled. Using the aforementioned example, if the window size is 10 (i.e., the windowing condition is a tuple count of 10), then the stream operator 614 deletes the seven tuples before the window is filled to 10.

In various embodiments, more than one window 624 may be present in a stream operator. For example, two windows may be present, a first window with a time-based condition and a second window with a tuple count condition. If the first window is reached first, then the first window 624 may trigger. After triggering, then the first window may be reset and the second window can later trigger based on tuple count. Multiple customized conditions 612 can be used to apply to different windows. For example, a first customized condition can be used for the first window and a second customized condition can be used for the second window.

Figure 7:
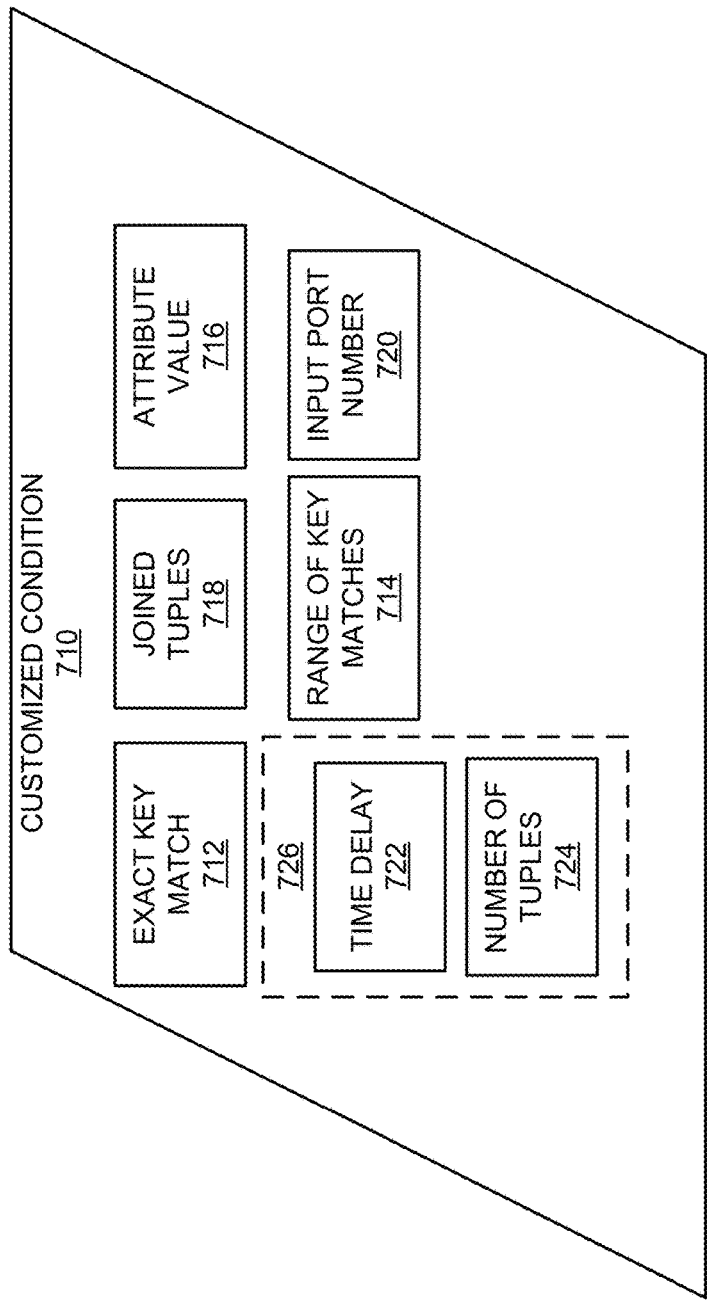
FIG. 7 illustrates various examples of a customized condition 710 that can be received by a customized input port, according to various embodiments.

FIG. 7 illustrates various examples of a customized condition 710 that can be received by a customized input port, according to various embodiments. The customized condition 710 can correspond to the customized condition 612 from FIG. 6. As aforementioned, the customized condition 710 is a condition that is configurable by a user. The customized condition is provided by the user via the condition source. Examples of customized conditions are provided herein.

A customized condition 710 can be an exact key match 712 condition. An exact key match 712 may occur whenever the customized condition 710 is a key. The stream operator may receive an exact key match 712 condition and monitor a stream of tuples for the particular key. The stream operator may receive a tuple that includes a key-value pair. For example, within a first group of tuples defined by a window, a first tuple can have the format {milk: cookies} and a second tuple can have the format {butter: bread}. If the customizable condition 710 is the keyword "milk" then the stream operator can select and delete the first tuple. In various embodiments, the key match 712 can be fulfilled when any key is fulfilled from a list of keys. For example, if the key is a list of URLs, then any match with a URL can trigger the customized condition.

A customized condition 710 can be an attribute value 716 condition. Using the example with the first group of tuples, the stream operator may use an attribute value 716 of "bread" to select and the second tuple. The attribute value 716 can also be used where the tuples are not in a key-value pair structure. For example, if a first and second tuple contain raw data in an unstructured format, then the attributes of the raw data may be used as an attribute value 716. The attribute value 716 condition may be independent from the keys.

A customized condition 710 can be a range of key matches 714 condition. A range of key matches 714 may be used when processing numbers or strings. For example, if a group of tuples within a window has a first tuple of {1: Kevin}, and a second tuple of {2: Mike}, then if the range of key matches is 1-2, then both the first tuple and the second tuple may be deleted. The range of key matches 714 can be based on strings. For example, using the example aforementioned, if the range of key matches 714 is "A thru L", then the first tuple may be deleted. The range of key matches 714 can be a number, integer, or a string/substring.

A customized condition 710 can be previously joined tuples 718 condition. The join tuples 718 can refer to a number of times a particular tuple is joined in prior join operations. For example, if a particular tuple is joined in an upstream join operation, then the tuple may have a metadata marker, a value that indicates that it was joined with another tuple, or other indication that the particular tuple was joined prior to being received by the stream operator. The stream operator may use the customized condition 710 of joined tuples 718 to delete those tuples that were previously joined.

A customized condition 710 can be an input port number 720 condition. The input port number 720 customized condition can cause a stream operator to select at least one input port from at least two input ports. In an example stream operator with two input ports, a first input port and a second input port, two separate streams of tuples can be joined at the stream operator. The input port number can exclude all or part of a stream of tuples from one of the input ports, e.g., the first stream operator. Excluding all or part of a stream of tuples from one of the input ports may be beneficial in a situation where the two streams are from different social media content providers. For example, if the user desires to exclude a social media content provider that provides a stream of tuples to a first input port, then the user can delete all of the tuples from the first input port. If the user desires to exclude only a portion of tuples that refer to a certain news topic, then the user can combine exclusion of the first input port with a keyword match 712. The stream operator can also select from a first input port and a second input port and determine whether a first tuple fulfills the customized condition at a selected input port. In various embodiments, the stream operator can select from more than two input ports. For example, if there is a three stream join operator, then the stream operator may exclude one or more input streams from the join.

The customized condition 710 can include additional timing conditions 726. The additional timing conditions 726 are conditions that may be combined with a customized condition 710. The additional timing conditions 726 describe when a tuple that fulfills the customized condition 712 is deleted. Thus, the additional timing condition 726 can be used to describe when deletion of the tuple is triggered. The additional timing conditions 726 can be distinct from the customized condition 710. The additional timing conditions 726 include a time delay 722 and a number of tuples condition 724.

A customized condition 710 can include a time delay 722 for when the tuples are to be deleted from the stream operator. The time delay 722 could include an amount of time for delaying deletion of tuples before any subsequent joining is performed. The time delay 722 could also include delaying the deletion of tuples for a certain amount of time from when the customized condition 710 is received. For example, if a stream of tuples is received by a stream operator with a delay 722 condition, then the stream operator waits for a predefined amount of time and deletes the tuples in the window after the predefined amount of time.

A customized condition 710 can be a number of tuples 724 condition. The number of tuples 724 condition and the time delay 722 can specify to the stream operator when to delete tuples which may be distinct from the customized condition 710. The number of tuples condition 724 can cause the stream operator to delete one or more tuples after a number of tuples from the stream of tuples are received. In the number of tuples 724 condition, the stream operator waits for a predefined number of tuples within a window, and deletes the tuples in the window. In various embodiments, the customized condition 710 is selected from a time delay 722 and a number of tuples 724. The customized condition 710 can be a history of tuples. For example, the last one-hundred thousand tuples processed may have certain attributes that were repeated. The stream operator can remove the future tuples that do not have the certain attributes.

FIG. 8A illustrates an example of the operation of a windowed stream operator 800A processing tuples, according to various embodiments. The windowed stream operator 800A may be a join operator that joins two streams of tuples from sources 810, 811, and outputs the joined tuples to the sink 814. The windowed stream operator 800A may have two input ports; input port 818 that receives a stream of tuples from source 810 and input port 820 that receives a stream of tuples from source 811. The windowed stream operator 800A may output a third stream of tuples to the sink 814 via the output port 816.

The stream operator 800A has at least two input ports, a first input port 818 and a second input port 820. A first stream of tuples is received from source 810 and a second stream of tuples is received from source 811. In various embodiments, one stream of tuples, instead of two stream of tuples, can be received by the stream operator 800A. The stream operator 800A can join the first group of tuples, e.g., tuple A, and the second group of tuples, e.g., tuple B.

For example, the stream of tuples received by the input port 818 from the source 810 includes tuple A, tuple C, and tuple D. The stream of tuples received by the input port 820 from the source 811 includes tuple B, and tuple E. The windowed stream operator 800A can have a window 822. In various embodiments, the window 822 may be responsive to a windowing condition which may be independent from a customized condition. The join may work before the window 822. For example, if a window 822 size is three tuples, then the join may preempt the windowing condition. The window 822, once the windowing condition has been fulfilled, can be triggered to perform either a slide or a tumble and cause windowed tuples to get automatically evicted. The stream operator 800A may form a group of tuples. The group of tuples may be a group of tuples that have not filled a window, e.g., 822. For example, the stream operator 800A can receive tuples D and C at the input port 818. Tuple C and tuple D can be separate groups of tuples or tuple C and tuple D can form a single group of tuples. In various embodiments, the group of tuples may form before the input ports 818, 820 of stream operator 800A. The group of tuples may be based on tuples that are anticipated to be within the same window 822.

The tuples may exist within three time periods, time period x, time period y, and time period z. The time period x may be whenever a window, e.g., 822 is triggered. Time period y and time period z may be a time period before the window is triggered in period x. For example, time period z may have joined tuples, tuple D and E, that will go into a new window. The time period denoted by y may indicate an area outside of either window x, or window z. In window 822, the windowed stream operator 800A, may group tuple A and tuple B. When the window 822 is full, then the window 822 triggers and groups tuple A and tuple C. After the window 822 triggers, then tuples A and C can be removed. In various embodiments, a join operation between tuples from input port 818 and input port 820 can occur prior to time period x and even before time period z. Since tuple C does not have a corresponding tuple to join with, then the output of the windowed stream operator 800A may be a combination of tuple A and tuple B (from window 822) followed by a combination of tuple D and tuple E (from time period z).

FIG. 8B illustrates an example of the operation of a windowed stream operator 800B that is configured to delete tuples in response to the customized condition 812, according to various embodiments. The windowed stream operator 800B may be similar to the windowed stream operator 800A, except the windowed stream operator 800B is configured to receive a customized condition 812 at a specialized customized input port.

The window 822 can trigger at time period x as in FIG. 8A. However, the windowed stream operator 800B can delete tuple C and tuple D because of the customized condition 812. Tuple C and tuple D can be deleted at any time period prior to time period x (i.e., a window triggering event) and do not necessarily have be within the window 822. In various embodiments, the windowed stream operator 800B can delete tuple C and tuple D simultaneously once tuple C and D are at the input port 818 and prior to the join operation. The windowed stream operator 800B can also delete tuple C and tuple D when each tuple reaches time period y and after a join operation. The window 822 can trigger at time period x and the result from the output port 816 is a combination of tuple A and tuple B, followed by tuple E.

Figure 9:
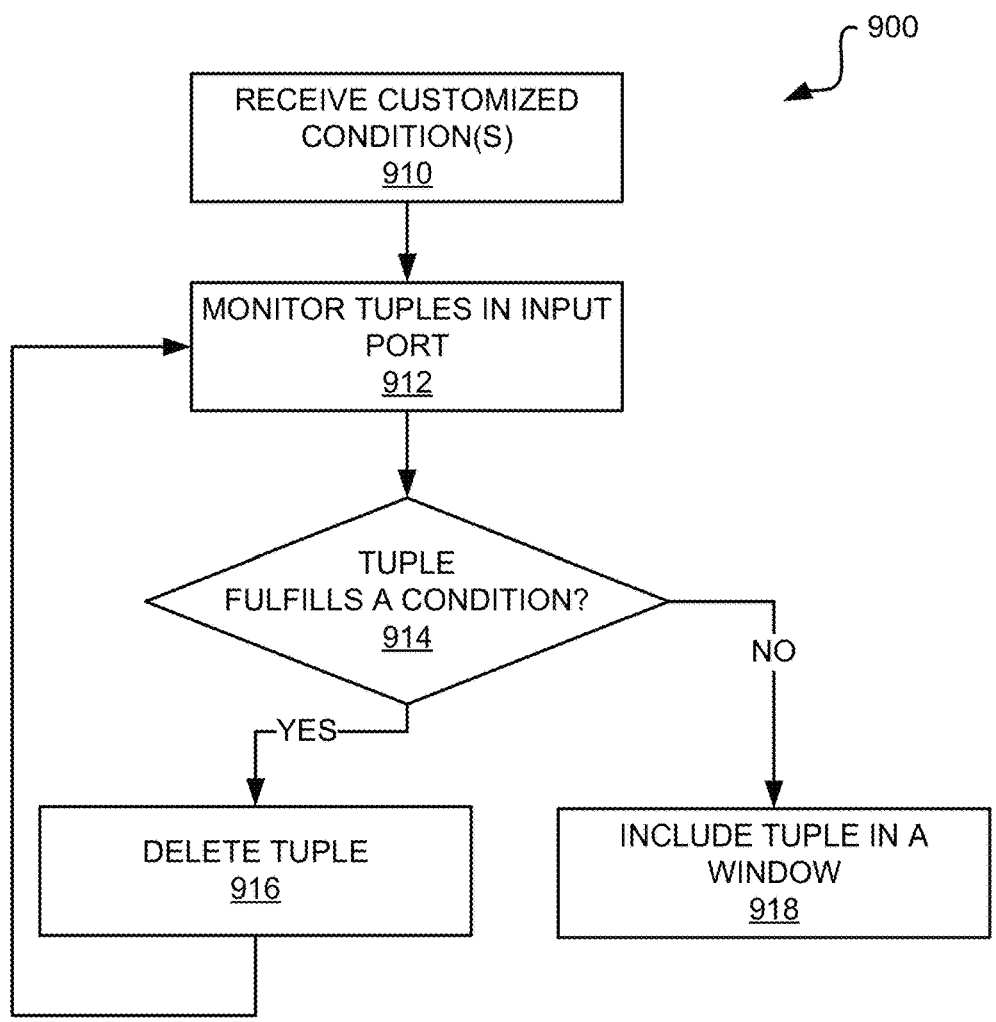
FIG. 9 illustrates a flowchart of a method 900 for deleting tuples responsive to a customized condition, according to various embodiments.

FIG. 9 illustrates a flowchart of a method 900 for deleting tuples responsive to a customized condition, according to various embodiments. The method 900 can be for a stream operator with a window condition and a condition input port. The method 900 can begin at operation 910.

In operation 910, the stream operator receives, at runtime, a customized condition at the condition input port. The condition input port may receive the customized condition in an exclusive manner. For example, the condition input port receives the customized condition and not the stream of tuples. In various embodiments, operation 910 may involve receiving the customized condition at an input port that receives both a stream of tuples and the customized condition.

In operation 912, the stream operator monitors a first group of one or more tuples from the stream of tuples at a window of the stream operator. The first group of one or more tuples can also correspond to a time period before the window is triggered. For example, if a window triggers at time period z, the first group of one or more tuples can be tuples within the time period y, which comes before time period z.

In operation 914, the stream operator determines whether the first group of one or more tuples at the window fulfills the customized condition. A tuple can fulfill a customized condition in a variety of manners described herein. For example, a tuple can have an attribute that is an exact key match for a keyword condition. The stream operator can examine one or more tuples found within the first group of tuples. For example, the stream operator can examine the first group of tuples at or prior to the window triggering condition. Assuming that the first group of tuples is examined prior to the windowing triggering condition, then the stream operator can delete the first group of tuples in operation 916.

In operation 916, the stream operator deletes, in response to the first group of one or more tuples fulfilling the customized condition, the first group of one or more tuples. The stream operator can delete the first group of one or more tuples prior to the windowing condition is triggered. For example, the tuples within the windowing condition may be "filtered" to remove those tuples that fulfill the customized condition which would improve performance of the stream operator.

In various embodiments, the deleting of the first group of one or more tuples may occur at the same time as the windowing condition is triggered. For example, the triggering of the windowing condition may delete selected tuples during a join. In various embodiments, the deleting of the first group of one or more tuples can occur simultaneously with receiving the customized condition. For example, once a customized condition is received, then every tuple within the window fulfilling the customized condition may be deleted. Each window that has not triggered may require a new customized condition.

In addition to deleting tuples as the tuples arrive at the stream operator, the deleting of the first group of one or more tuples may also delete tuples that are stored within the memory of a compute node that supports the stream operator. For example, as tuples are processed by the stream operator, the tuples may be stored in memory until the windowing condition is triggered. The stream operator can delete tuples within the memory that fulfill the customized condition.

In operation 918, the stream operator can include the first group of one or more tuples in a window. The stream operator can implement a windowing condition on the window and resume processing.

In various embodiments, the deleting the first group of one or more tuples can occur after a period of time of the receiving the customized condition. For example, if the first group of three tuples is processed in a window, then after a period of time, the windowing condition can be applied to produce a first tuple, a second tuple, and a third tuple. If the second tuple fulfills a customized condition, and there is a delay between receiving the customized condition and deleting the second tuple, then the second tuple can be deleted after the windowing condition at the output port.

In various embodiments, the deletion of the tuple using the customized condition may occur prior to the triggering of the window in the stream operator. For example, a group of tuples that fills a window within a stream operator. The stream operator window can trigger every ten tuples. One or more tuples within the group of tuples may fulfill a customized condition. The tuples fulfilling the customized condition can be removed prior to the tuple ever reaches the window. Thus, the windowing condition with the ten tuples may trigger using a "filtered" window of tuples.

In various embodiments, the monitoring by the stream operator can occur on a tuple basis or on a group basis. For example, in the group basis, if any tuple from a group of tuples fulfills the customized condition, then the stream operator can delete the group of tuples. In another example using a tuple basis, only the tuple that fulfills the condition is deleted and not the group. The order of the tuple deletion can occur concurrent with the windowing condition within the stream operator. For example, when the window of the stream operator triggers, the tuple may be simultaneously deleted.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for managing a first stream of tuples within a window of a stream operator, comprising:
   receiving the first stream of tuples to be processed by the stream operator hosted by one or more computer processors, the stream operator having at least one input port and a condition input port;
   receiving, at runtime, a customized condition at the condition input port of the stream operator;
   monitoring a first group of one or more tuples from the first stream of tuples at a first window of the stream operator, wherein the first group of one or more tuples are stored within a memory of a compute node that supports the stream operator;
   determining whether the first group of one or more tuples at the first window fulfills the customized condition;
   determining that a first number of times the first group of one or more tuples were joined upstream from the stream operator fulfills a join trigger condition; and
   deleting, from the memory and in response to the first group of one or more tuples fulfilling the customized condition and the join trigger condition, the first group of one or more tuples.

2. The method of claim 1, wherein deleting the first group of one or more tuples occurs within a period of time of the receiving the customized condition.

3. The method of claim 1, wherein deleting the first group of one or more tuples occurs after a number of tuples from the stream of tuples are received.

4. The method of claim 1, wherein the stream operator is a join stream operator having at least two input ports and the condition input port.

5. The method of claim 4, wherein the customized condition selects at least one input port from the at least two input ports.

6. The method of claim 5, further comprising:
   selecting, randomly, from the at least two input ports, a selected input port, wherein the selected input port is an input port at which to receive the first stream of tuples; and
   determining whether a first tuple fulfills the customized condition at the selected input port.

7. The method of claim 4, further comprising:
   wherein the at least two input ports include a first input port and a second input port; wherein receiving the first stream of tuples occurs at the first input port;
   receiving, at the second input port, a second stream of tuples having a second group of one or more tuples;
   joining, in response to the first group of one or more tuples and the second group of one or more tuples fulfilling a windowing condition at the first window, the first group and the second group; and
   wherein the deleting the first group of tuples occurs prior to the joining.

8. The method of claim 1, wherein the customized condition is a condition that is configurable by a user.

9. The method of claim 1, wherein the customized condition is a key from a key-value pair.

10. The method of claim 9, wherein determining whether the first group of one or more tuples at the first window fulfills the key.

11. The method of claim 9, wherein determining whether the first group of one or more tuples at the first window fulfills a range of keys.

12. The method of claim 1, wherein the customized condition is one or more attribute values from a key-value pair.

13. The method of claim 1, wherein the customized condition is a number of times the first group of one or more tuples is joined in prior join operations.

14. The method of claim 1, wherein the customized condition is selected from a time delay and a number of tuples.

15. The method of claim 1, wherein deleting the first group of one or more tuples occurs simultaneously with the receiving the customized condition.

16. The method of claim 1, wherein the customized condition is an exact key match condition, wherein determining whether the first group of one or more tuples at the first window fulfills the customized condition further comprises:
  determining that each of the one or more tuples of the first group of one or more tuples at the first window includes a first key including a first uniform resource locator (URL); and
  determining, in response to determining that each of the one or more tuples of the first group of one or more tuples at the first window includes the first key including the first URL, that the first group of one or more tuples at the first window fulfills the customized condition.

17. The method of claim 1, wherein prior to deleting the first group of one or more tuples, the method comprises determining a second number of times the first group of one or more tuples will be joined in the future downstream the stream operator,
  wherein the first number of times the first group of one or more tuples were joined upstream the stream operator and the second number of times the first group of one or more tuples will be joined in the future downstream the stream operator are both compared to the join trigger condition, and
  wherein if an addition of the first number of times and second number of times exceeds the join trigger condition, a determination is made that the first group of one or more tuples fulfills the join trigger condition.

18. A method for managing tuples within a window of a stream operator, the method comprising:
  receiving a first stream of tuples at a first input port to be processed by the stream operator, the stream operator having at least one condition input port;
  receiving, at runtime, a customized condition at the condition input port of the stream operator, the customized condition including an attribute value condition, an input port condition, a time delay condition, and a tuple number condition, the attribute value condition specifying a range of integer values required to satisfy the customized condition, the input port condition specifying one or more input ports required to satisfy the customized condition, the time delay condition specifying a time delay required to satisfy the customized condition, and the tuple number condition specifying a number of tuples required to satisfy the customized condition;
  monitoring a first group of one or more tuples from the first stream of tuples at a first window of the stream operator;
  determining that each tuple in the first group of one or more tuples includes an integer value within the range of integer values;
  determining that the first input port is specified in the one or more input ports by the input port condition;
  determining that the first group of one or more tuples have been in the first window for at least the time delay required to satisfy the time delay condition;
  determining that the number of tuples included in the first group of one or more tuples is at least the number of tuples required to satisfy the tuple number condition; and
  deleting the first group of one or more tuples in response to determining that each tuple in the first group of one or more tuples includes the integer value within the range of integer values, that the first input port is specified in the one or more input ports by the input port condition, that the first group of one or more tuples have been in the first window for at least the time delay, and that the number of tuples in the first group of one or more tuples is at least the number of tuples required to satisfy the tuple number condition.

19. The method of claim 18, wherein the method further comprises:
  receiving a second stream of tuples at the first input port to be processed by the stream operator;
  monitoring a second group of one or more tuples from the first stream of tuples at the first window of the stream operator;
  determining that each tuple in the second group of one or more tuples includes an integer value within the range of integer values;
  determining that the first input port is specified in the one or more input ports by the input port condition;
  determining that the second group of one or more tuples have been in the first window for at least the time delay required to satisfy the time delay condition;
  determining that the number of tuples included in the second group of one or more tuples is not the number of tuples required to satisfy the tuple number condition; and
  passing, in response to determining that the number of tuples in the second group of one or more tuples is not the number of tuples required to satisfy the tuple number condition, the second group of one or more tuples downstream the stream operator.

* * * * *